Oct. 4, 1938.                F. M. ASHLEY                2,132,141
                        PIPE AND FILTER THEREFOR
                          Filed April 24, 1936
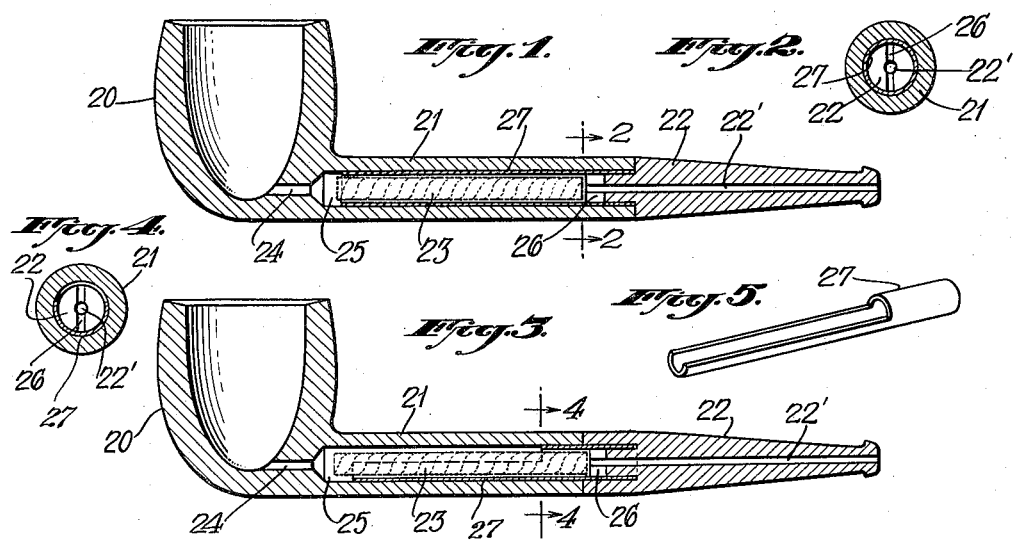
INVENTOR.
FRANK M. ASHLEY.
BY Ashley & Ashley.
ATTORNEYS Patented Oct. 4, 1938

2,132,141

UNITED STATES PATENT OFFICE 2,132,141

PIPE AND FILTER THEREFOR

Frank M. Ashley, Great Kills, Staten Island, N. Y., assignor to Lewis Gompers, as trustee Application April 24, 1936, Serial No. 76,146

1 Claim. (Cl. 131—202)

My invention relates to pipes for smoking tobacco. The object of my invention is to provide a pipe construction in which a filter may be used to absorb the juices extracted in the act of smoking, and to provide filtering means that may be inserted in the pipe quickly, and removed therefrom without touching the filtering elements, and also to provide a pipe which may be used without the filter when none is available.

A further object is to provide a construction which will permit of pipes heretofore made to be easily altered to provide the construction herein described.

A further object is to provide novel filtering means for a pipe.

Referring to the drawing which forms a part of this specification:

Fig. 1 is a longitudinal sectional view through a pipe embodying my invention.

Fig. 2 is a cross sectional view on line 2—2 of Fig. 1 shown on an enlarged scale.

Fig. 3 is a longitudinal sectional view showing a construction in which the upper side of the tube shown in Figure 1 is cut away to form a tray in which a filter may lie.

Fig. 4 is a cross sectional view on line 4—4 of Figure 3 shown on an enlarged scale.

Fig. 5 is a perspective view of the tube shown in Figure 3.

The construction comprises a bowl 20, a stem 21, a mouthpiece 22, and filter material 23.

A passage 24 of small diameter leads to a bore 25 of relatively large diameter.

The inner ends of the mouthpieces are each formed with a transverse slot 26.

The slot referred to serves as a passage for the smoke in the event that the end of the filter should rest against the central passage 22' in the mouthpiece, or against the passage 24 leading from the bowl, and obstruct the flow of smoke; the diameter of the bores being greater than that of the filters used, as will be readily understood.

In Figures 1, 2, 3, 4, and 5, a thin tube, preferably of aluminum, is indicated by 27, the cylindrical end of which is fixed on the inner end of the mouthpiece as shown in Figure 1, or within the end as shown in Figure 3, and the inner diameter of the tubes is somewhat greater than the diameter of the filters used, so that after smoking, the mouthpiece may be removed from the stem together with the tube, and the filter ejected therefrom by a snappy jerk without touching it, thus preventing soiling the fingers and saving time.

If the filters are located in the stem portion formed integral with the bowl, this portion of the pipe is jerked in the same manner to eject the filter.

The tube fits in close sliding engagement with the wall of the bore when constructed as illustrated as shown in Figures 1 and 3, and serves to hold the mouthpiece in proper position while affording a strong joint.

In all of the constructions shown, the passages may be cleaned with the ordinary pipe cleaners commonly sold for the purpose when the filter is removed, since they are open at both ends, as is also the tube in the other forms of the device.

It will be observed that pipes already made may be altered by the simple operation of drilling the stem to the required diameter to hold the filter, and to form a slot 26 in the end of the mouthpiece.

It will also be seen that the pipe may be used as in the ordinary manner, if no filters are available.

Having thus described my invention I claim as new:

A mouthpiece formed of one piece of material having a shouldered portion with a deep diametral slot at a free end thereof, a bore throughout the length of the mouthpiece, and a filter support embracingly secured about the slotted shouldered portion to strengthen the same and having one side thereof for substantially a greater portion of its length of open formation, the natural width of the opening being the maximum width of the support.

FRANK M. ASHLEY.